United States Patent [19]

Hernvall et al.

[11] Patent Number: 5,765,599
[45] Date of Patent: Jun. 16, 1998

[54] ELASTIC MILKING MACHINE HOSE

[75] Inventors: Hans Hernvall, Farsta; Torbjörn Pettersson, Gnesta, both of Sweden

[73] Assignee: Alfa Laval Agri International AB, Tumba, Sweden

[21] Appl. No.: 506,683

[22] Filed: Jul. 25, 1995

Related U.S. Application Data

[63] Continuation of Ser. No. 90,194, filed as PCT/SE92/00074 Feb. 7, 1992, abandoned.

[30] Foreign Application Priority Data

Feb. 14, 1991 [SE] Sweden ................... 9100439

[51] Int. Cl.⁶ .................................... F16L 11/08
[52] U.S. Cl. ................... 138/133; 138/153; 138/174
[58] Field of Search ..................... 138/125, 126, 138/132, 133, 153, 172, 174

[56] References Cited

U.S. PATENT DOCUMENTS

| Re. 33,412 | 10/1990 | Oglesby et al. | 138/126 |
| 1,281,557 | 10/1918 | Goodall | |
| 2,661,025 | 12/1953 | Brace | 138/133 |
| 2,897,839 | 8/1959 | Roberts et al. | |
| 3,289,703 | 12/1966 | Brown | 138/125 |
| 3,334,663 | 8/1967 | Peterson | |
| 4,098,298 | 7/1978 | Vohrer | 138/132 |
| 4,103,713 | 8/1978 | Haytock, III | 138/133 |
| 4,136,149 | 1/1979 | Payne | 138/126 |
| 4,342,612 | 8/1982 | Lalikos et al. | 138/132 |
| 4,499,926 | 2/1985 | Friberg | 138/126 |

Primary Examiner—David Scherbel
Assistant Examiner—James F. Hook
Attorney, Agent, or Firm—Hovey, Willliams, Timmons & Collins

[57] ABSTRACT

A hose (24) constitutes a part of a milking machine and has an end portion (30) which is radially expanded and applied on a tubular nipple (29), the outer diameter of which exceeds the inner diameter of the hose. The milking machine includes structure for providing a negative pressure in the hose. The hose is reinforced by including at least one elongated reinforcement member (25), (26) which consists of material substantially harder than the wall of the hose and which extends along the hose in a helical cavity in the wall of the hose. In addition, the reinforcement member completely fills up the cavity and is arranged therein, such that relative movement between the reinforcement member and the wall of the hose is allowed.

8 Claims, 2 Drawing Sheets

ELASTIC MILKING MACHINE HOSE

This application is a continuation of prior Application Ser. No. 08/090,194 filed on Jul. 26, 1993, now abandoned, entitled ELASTIC MILKING MACHINE HOSE, which is a national phase application of International Application PCT/SE92/00074 filed Feb. 7, 1992.

BACKGROUND OF THE INVENTION

1. Field of the Invention

The present invention relates to a hose comprising an annular elastic wall having a circular cross-section, and two end portions, each of which is radially expanded and applied on a tubular nipple having an outer diameter exceeding the inner diameter of the annular wall. The hose constitutes a part of a milking machine and said milking machine has means for generating a negative pressure in the hose.

2. Description Of The Prior Art

Milk conducting hoses of milking machines must fulfill certain requirements, namely: that they do not tend to collapse under influence of a determined negative pressure (nowadays it is often required that hoses of this kind shall stand a vacuum level of 75 kPa as compared with 50 kPa previously), and thus do not throttle the milk flow during milking, that they are resistant to exterior mechanical stresses, for instance tramping of the animals, that they are easy to wash up, i.e. have smooth surfaces free of creases, in particular inside the hoses, and that they consist of a material allowed for contacting milk. Conventional hoses fulfilling these requirements consist of homogeneous materials and are relatively thick walled.

A drawback to conventional milking machine hoses is that they are relatively heavy, which among other things means that parts of the milking machine are heavy for the milker to carry. Thus, the hoses of a portable milking member of the milking machine can have a weight of up to about 2.5 kg. nother drawback to conventional hoses is that they are relatively resistant to bending, which means that it is difficult to place the milking member in an ideal position in relation to the udder. Thus, the relatively stiff hoses may give rise to an unequal load on the milking member, so that the milking member is tilted relative to the udder. This may result in an uneven milking of the udder and a risk of the milking member falling off during milking.

In addition, the development of automatic milking has created a need for hoses which are more flexible and lighter than the above described conventional hoses.

Hoses which are reinforced by means of stiff materials and which as a result may be made relatively light and flexible by reduction of the wall thickness of the hoses, are known in many other applications than milking. A common type of such a reinforced hose is provided by embedding reinforcement wires in the wall of the hose, which reinforcement wires extend helically along the hose coaxially with the latter, see for instance GB 1 533 204. As a result the wall thickness of the hose and, consequently, the weight of the hose can be reduced. It would appear suitable to utilize reinforced hoses of this type also for milking. However, such known reinforced hoses have the disadvantage that they are difficult to expand radially, and, consequently, the hoses are difficult to apply on connection nipples having larger outer diameter than the inner diameter of the hoses. For this reason the known hoses are unsuited for milking, because milking machines normally comprise a plurality of connection nipples having somewhat various outer diameters, on which connection nipples the hoses are to be applied manually.

Hoses provided with a reinforcement wire extending along the hose through a helical cavity in the wall of the hose are known from for instance SE 409 613 and US 2 798 508. In an unbent state the helical cavity of this type of hose has an extension as seen in an axial section through the hose which is substantially larger than that of the reinforcement wire. As the hose is bent said extension of the helical cavity is reduced in the part of the wall of the hose which forms an outwardly directed concave shape. As a result the hose will be extremely flexible.

However, said extreme flexibility of this type of hose is achieved at the expense of that the part of the hose wall, which forms an outwardly directed concave shape when bending the hose, is folded. In consequence, the hose will be unsuited for milking machines, since such folding may give rise to turbulent milk flow deteriorating the milk and is unacceptable from hygienic reasons. In addition, folds in the hose may give rise to inclusions of milk residues which are difficult to remove by washing. The relatively large cavity around the reinforcement wire may also give rise to cleaning problems and an undesirable axial compression of the hose, as the interior of the hose is subjected to vacuum.

SUMMARY OF THE INVENTION

The object of the present invention is to provide a new milking machine hose which is able to withstand a strong interior negative pressure and which is easy to bend, easy to wash up, has a low weight and allows radial expansion of the end portions of the hose when applying these on nipples.

This object is obtained by means of a hose of the kind initially stated, which is characterized in—(a) that the wall in a manner known per se is reinforced by at least one elongated reinforcement member consisting of a substantially harder material than the wall and extending along the hose in a helical cavity in the wall, the reinforcement member being arranged in said cavity, such that relative movement between the reinforcement member and the wall is allowed;—(b) that the reinforcement member completely fills up said cavity, and—(c) that in each radially expanded end portion of the hose, the reinforcement member is displaced relative to the hose along said helical cavity from the position in which the reinforcement member was situated when the end portion was unexpanded, the reinforcement member forming a helical path having a larger diameter along each expanded end portion than along the unexpanded wall of the hose.

A hose formed in this manner can be made more flexible and lighter than conventional hoses, without deteriorating the other necessary requirements of the hose and without undesirable folds being formed on the inner and outer surfaces of the hose when bending the hose. This means that a milking member of a milking machine equipped with the new hose will be easier to handle and will load the teats more equally during milking, as compared with milking members equipped with conventional hoses.

The statement that "the reinforcement member is arranged in the cavity, such that relative movement between the reinforcement member and the wall of the hose is allowed" should be understood such that the frictional resistance between the reinforcement member and the wall of the hose is not stronger than that the reinforcement member is displaced in the cavity at radial expansion of the end portions of the hose under influence of forces created when applying said end portions on conventional nipples. A frictional resistance sufficiently small may be achieved by choosing suitable materials, for instance polyamide or polypropylene in the reinforcement member and softened polyvinyl chloride, styrene rubber or nitrile rubber in the wall of the hose. As an alternative, the reinforcement member may be pretreated with an antiadhesive substance before or while the hose is fabricated.

Since the reinforcement member completely fills the cavity, an inexpensive fabrication of the hose is made possible by extruding the wall of the hose. During the extrusion, the reinforcement member is utilized for the formation of the helical cavity.

According to a preferred embodiment of the new hose, the wall is reinforced by at least two elongated reinforcement members extending helically and in parallel with one another along the hose. As a result, the end portions of the hose will be easier to expand radially, when applying said end portions on nipples, because each of said two reinforcement members can extend helically in a courser pitch than that of one single reinforcement member, without deteriorating the ability of the hose to resist the wall from collapsing. Thus, such a courser pitch means that each reinforcement can slide easier in its cavity.

The two helical reinforcement members suitably form two coils displaced 180° to one another, as seen in the circumferential direction of said coils. As a result, the wall of the hose will be uniformly reinforced along the hose by the two reinforcement members.

The hose may consist of a homogeneous material, which means a low cost for manufacturing the hose. However, by co-extrusion it is also possible to fabricate the hose with two concentric wall layers, one outer and one inner, wherein the outer wall layer may consist of a relatively inexpensive material whereas the inner layer may consist of a material relatively expensive and allowed for contacting milk. In addition, the outer wall layer may be made by a material more resistant to mechanical impacts than the inner wall layer. The outer wall layer may for instance contain substances against the deteriorating effect of ozone. Such substances are unsuitable in materials which will be in contact with milk.

Each cavity may be located in said outer wall layer, which normally is designed thicker than the more expensive inner wall layer, but as an alternative it may be located in both the outer wall layer and the inner wall layer. Of course, if desired the cavity may also be arranged solely in the inner wall layer.

DETAILED DESCRIPTION OF THE DRAWING

Figure 1:
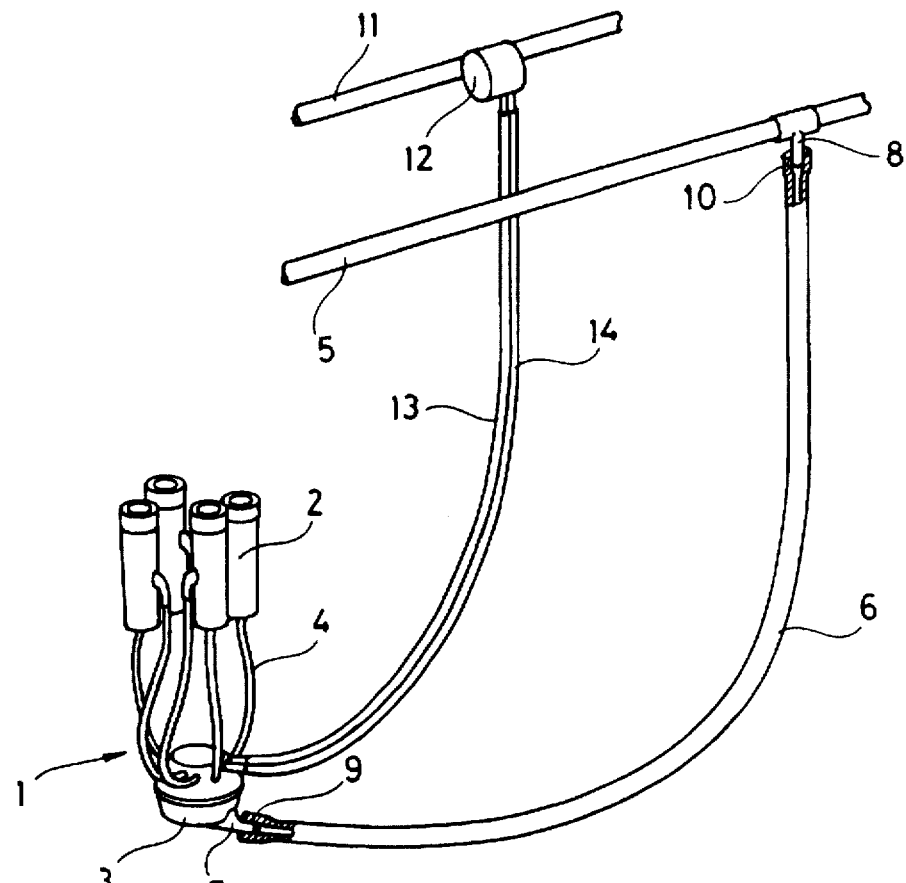
FIG. 1 is a pictorial view showing a milking machine including hoses according to the present invention.

The milking machine 1 shown in FIG. 1 comprises four teat cups 2, a teat cup claw 3, four teat cup liners 4, which connect the teat cups 2 to the teat cup claw 3, a milk conduit 5, and an elastic hose 6 with circular cross-section, which is connected to the teat cup claw 3 and the milk conduit 5. The teat cup claw 3 and the milk conduit 5 are provided with tubular connection nipples 7 and 8, respectively, with circular cross-section, on which respective end portions 9, 10 of the hose 6 are applied. The outer diameter of the connection nipples 7, 8 is larger than the inner diameter of the hose 6, which means that the end portions 9, 10 of the hose 6 are radially expanded and thereby are secured to the connection nipples 7, 8.

The milking machine 1 further comprises a vacuum conduit 11 with a pulsator 12, and two elastic hoses 13, 14 extending between the teat cup claw 3 and the pulsator 12 and connected to these via connection nipples in the same manner as described above for the hose 6. The vacuum hoses 13, 14 have substantially smaller diameter than the hose 6 but besides that they have the same design as the hose 6.

Figure 2:
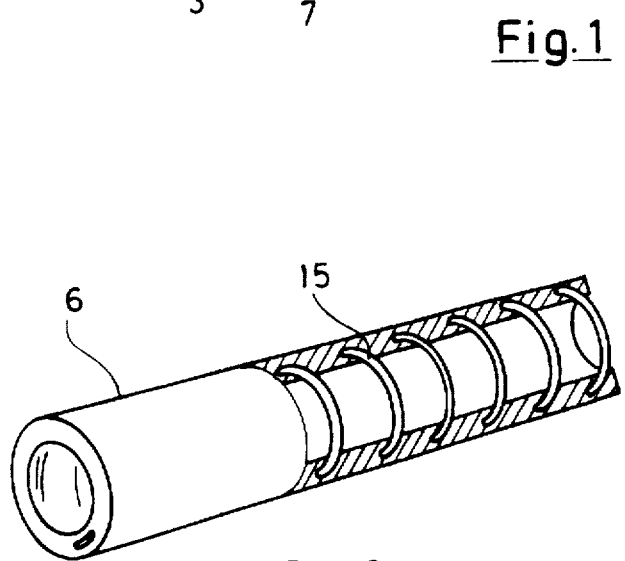
FIG. 2 is a partial sectional view of a milking machine hose in accordance with the present invention.

The hose 6 has a wall consisting of a seamless, substantially homogeneous elastic, thermoplastic or plastic non-yielding material, for instance softened polyvinyl chloride, styrene rubber or nitrile rubber, and is fabricated by extrusion (FIG. 2). A wire 15 with circular cross-section is embedded in the wall of the hose 6 and extends helically with a pitch which is substantially larger than the diameter of the wire 15 along the hose 9 and coaxially with the latter. (As an alternative, the wire 15 may have another cross-section, for instance oval or polygonal). The wire 15 consists of a substantially stiffer material than the wall of the hose 6, for instance metal, polyamide or polypropylene, and strengthens the resistance of the hose 6 against flattening when negative pressure prevails in the hose 6. As a result the wall of the hose 6 may be made substantially thinner than the walls of conventional hoses, which allows a weight reduction of the hose 6 by about 50%.

Figure 3:
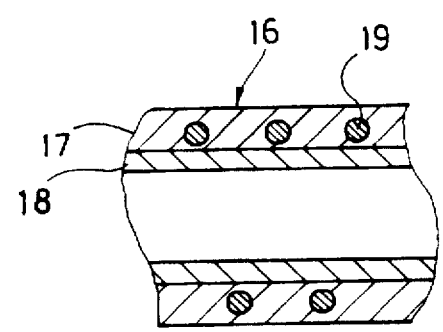
FIG. 3 is a sectional view through an alternative embodiment of the milking machine hose of the present invention.
Figure 4:
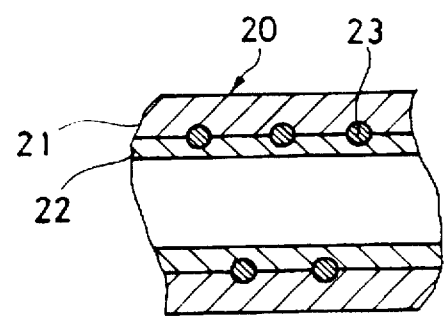
FIG. 4 is a sectional view through a second alternative embodiment of the milking machine hose in accordance with the present invention.

The hose 16 shown in FIG. 3 comprises two jointed coaxial outer and inner wall layers 17 and 18, respectively, of which the outer wall layer 17 preferably consists of a relatively inexpensive material whereas the inner wall layer 18, which will be in contact with milk, preferably consists of a relatively expensive material allowed for contacting milk. The hose 16 is provided with a reinforcement wire 19 of the same design as that of the hose 6 located only-in the outer wall layer 17. In FIG. 4 there is shown a hose 20 of the same type as the hose 16 according to FIG. 3 comprising an outer wall layer 21 and an inner wall layer 22, but provided with a reinforcement wire 23 located partly in both the outer wall layer 21 and the inner wall layer 22.

Figure 5:
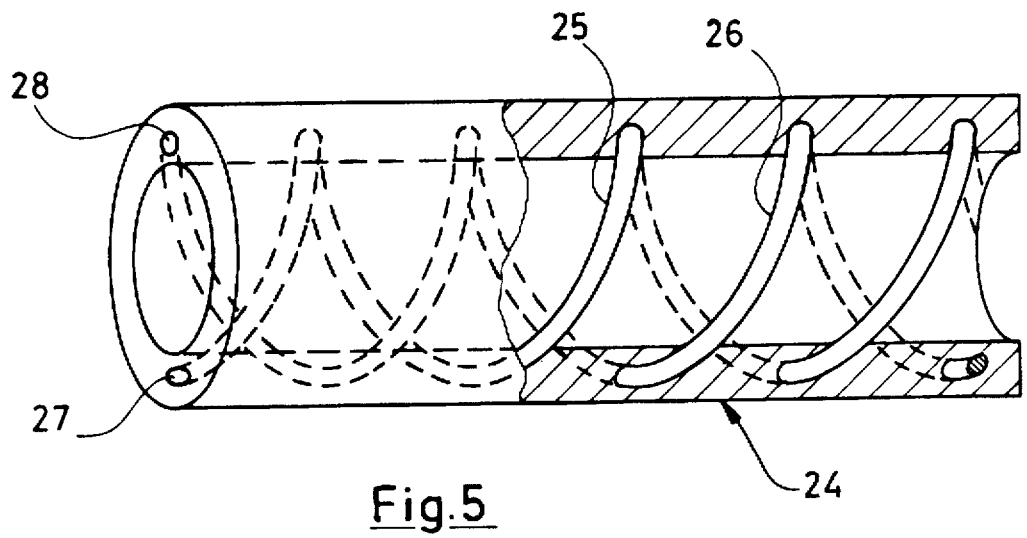
FIG. 5 is a view in partial section of a milking machine hose in accordance with the present invention showing reinforcement by two reinforcement members.

The hose 24 shown in FIG. 5 is identical to the hose 6 according to FIG. 2, except that the hose 24 is reinforced by two wires 25 and 26. Each of these wires 25, 26 extends helically along the wall of the hose 24 with a pitch which is twice the pitch of the wire 15 of the hose 6. The wires 25, 26 extend in parallel with one another along the hose 24 and form two coils displaced 180° to one another, as seen in the circumferential direction of said coils.

Figure 6:
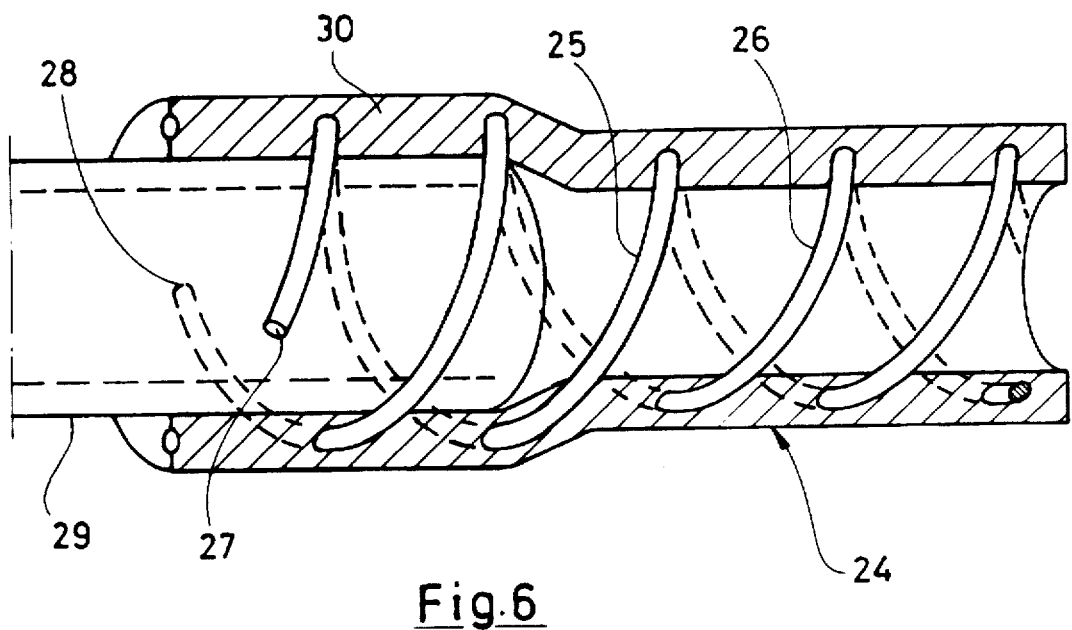
FIG. 6 is a view similar to FIG. 5 showing the milking machine hose of FIG. 5 applied on a nipple.

FIG. 6 illustrates how two ends 27 and 28 of the wires 25 and 26, respectively, change positions in the cavities of the hose 24, as an end portion 30 of the hose 24 is applied on a nipple 29.

When manufacturing hoses according to the invention by extruding the wall material of the hose, the reinforcement wire is utilized as an antiadhesive mould, so that a cavity having dimensions corresponding to the reinforcement wire is formed in the wall of the hose. In this manner it is made possible that the reinforcement wire completely fills up said cavity in the finished hose without resulting in a chemical joint.

We claim:

1. A hose comprising:

an annular, unitary, extruded elastic wall having a circular cross-section, an inner diameter and an outer diameter, a thickness, and two end portions, each of which is radially expandable to be applied on a tubular nipple having an outer diameter substantially exceeding the inner diameter of the annular wall, said wall resenting seamless inner and outer surfaces; and at least one elongated reinforcement member of a substantially harder material than the wall and extending along the hose in a helical cavity in the wall and completely filling up said cavity, said cavity being formed during extrusion of said wall using said reinforcement member as a mold, said reinforcement member and wall being relatively movable to allow a substantial radial expansion of any one of said two end portions for enabling application of said end portion on said tubular nipple, said reinforcement member having a thickness less than the thickness of said elastic wall.

2. A hose according to claim 1, wherein the wall of the hose consists of a substantially homogeneous material.

3. A hose according to claim 1, wherein the wall is reinforced by at least two elongated reinforcement members extending in parallel with one another along the hose in two helical cavities, respectively, in the wall.

4. A hose according to claim 3, whereby the two reinforcement members form two coils displaced 180° to one another, as seen in the circumferential direction of said coils.

5. A hose according to claim 3, wherein the wall of the hose comprises two concentrical wall layers, one outer and one inner, and each cavity is solely located in the outer wall layer.

6. A hose according to claim 3, wherein the wall of the hose comprises two concentrical wall layers, one outer and one inner, and each cavity is located in both the outer wall layer and the inner wall layer.

7. A hose according to claims 1, wherein the wall of the hose consists of comprises two concentrical wall layers, one outer and one inner.

8. A hose according to claim 7, wherein the outer wall layer consists of a first material whereas the inner wall layer consists of a second material different from said first material and suitable for contacting milk.

* * * * *